United States Patent [19]

Mary et al.

[11] 3,939,481

[45] Feb. 17, 1976

[54] FACSIMILE RECEIVER HAVING MOVABLE PRINTING BAR

[75] Inventors: Jacques Mary, Bagneux; Pierre Merillou, Grigny, both of France

[73] Assignee: Compagnie Industrielle des Telecommunications Cit-Alcatel, Paris, France

[22] Filed: July 30, 1974

[21] Appl. No.: 493,104

[30] Foreign Application Priority Data

Aug. 6, 1973  France .............................. 73.28669

[52] U.S. Cl. ............. 346/74 E; 178/6.6 A; 346/101
[51] Int. Cl.² .......................... H04N 1/16; B41J 3/20
[58] Field of Search ......... 178/5, 6.6 A; 346/74 EL, 346/74 ES, 74 R, 101, 141, 139 C

[56] References Cited
UNITED STATES PATENTS

| | | | |
|---|---|---|---|
| 2,415,229 | 2/1947 | Young | 346/101 |
| 2,728,627 | 12/1955 | Alden | 346/101 |
| 2,785,039 | 3/1957 | Artzt | 346/74 EL |
| 2,936,208 | 5/1960 | Lupish | 346/101 |

*Primary Examiner*—Alfred H. Eddleman
*Assistant Examiner*—Jay P. Lucas
*Attorney, Agent, or Firm*—Craig & Antonelli

[57] ABSTRACT

In a facsimile receiver wherein the printing bar is mounted for reciprocal movement between an operative position against the drum carrying the printing helix and an inactive position remote therefrom, means is provided for automatically displacing the printing bar toward its operative position upon rotation of said drum. In this regard a mechanical locking means is included for maintaining said printing bar in its operative position and a release mechanism serves to release the printing bar upon termination of the printing operation.

4 Claims, 2 Drawing Figures

FACSIMILE RECEIVER HAVING MOVABLE PRINTING BAR

BACKGROUND OF THE INVENTION

This invention relates to a facsimile receiver and more particularly to a continuously moving device carrying a printing bar.

In this type of apparatus, the printing takes place generally on electrolytic paper. It results from the passage of current between the printing bar and a helix arranged across the paper. The helix is supported by a rotating drum and its movement relative to the printing bar ensures the scanning of the paper.

The present invention is applied to a facsimile receiver having a chassis carrying a drum provided with a printing helix; a printing bar arranged between a supply roller and a drive roller; a guide roller for guiding a web of paper to be printed between the drum and the printing bar; a support for the printing bar and a pressure-roller for pressing the paper web against the drive roller. The chassis is pivotally mounted about an axis parallel to the axis of the drum so as to be displaceable between two positions, a first position in which the web of paper is held against the guide roller, between the drum and the printing bar, and between the drive roller and the presser-roller, and a second position giving free access to the supply roller and to the printing bar, thereby facilitating replacement of the paper roll and printing bar.

With such an apparatus, in order to avoid the risk of damaging the paper, the printing bar is only in contact with the paper, and the paper with the helix, during the actual time of transmission. Generally, with this type of apparatus, an electromagnet is used to automatically place the printing bar, the paper, and the helix into contact with each other, but this has the disadvantage of requiring the electromagnet coil to be continuously energized. Furthermore, in the case of coil failure, the various elements are not placed in contact with each other as required.

Preferably, in accordance with the present invention, a locking finger is supported by a locking lever articulated about an axis and provided with a spring tending to return the finger to the control shaft and against a stop, the axis of the finger being arranged parallel to the control shaft. This serves to maintain the chassis in its first position, whereby the printing bar is disposed in contact with the paper and the paper in contact with the helix. Furthermore, the locking finger may cooperate with a nib arranged at the end of the locking lever.

The invention will now be described in more detail, by way of example only, with reference to the accompanying drawings, in which.

PREFERRED EMBODIMENT OF THE INVENTION

Figure 2:
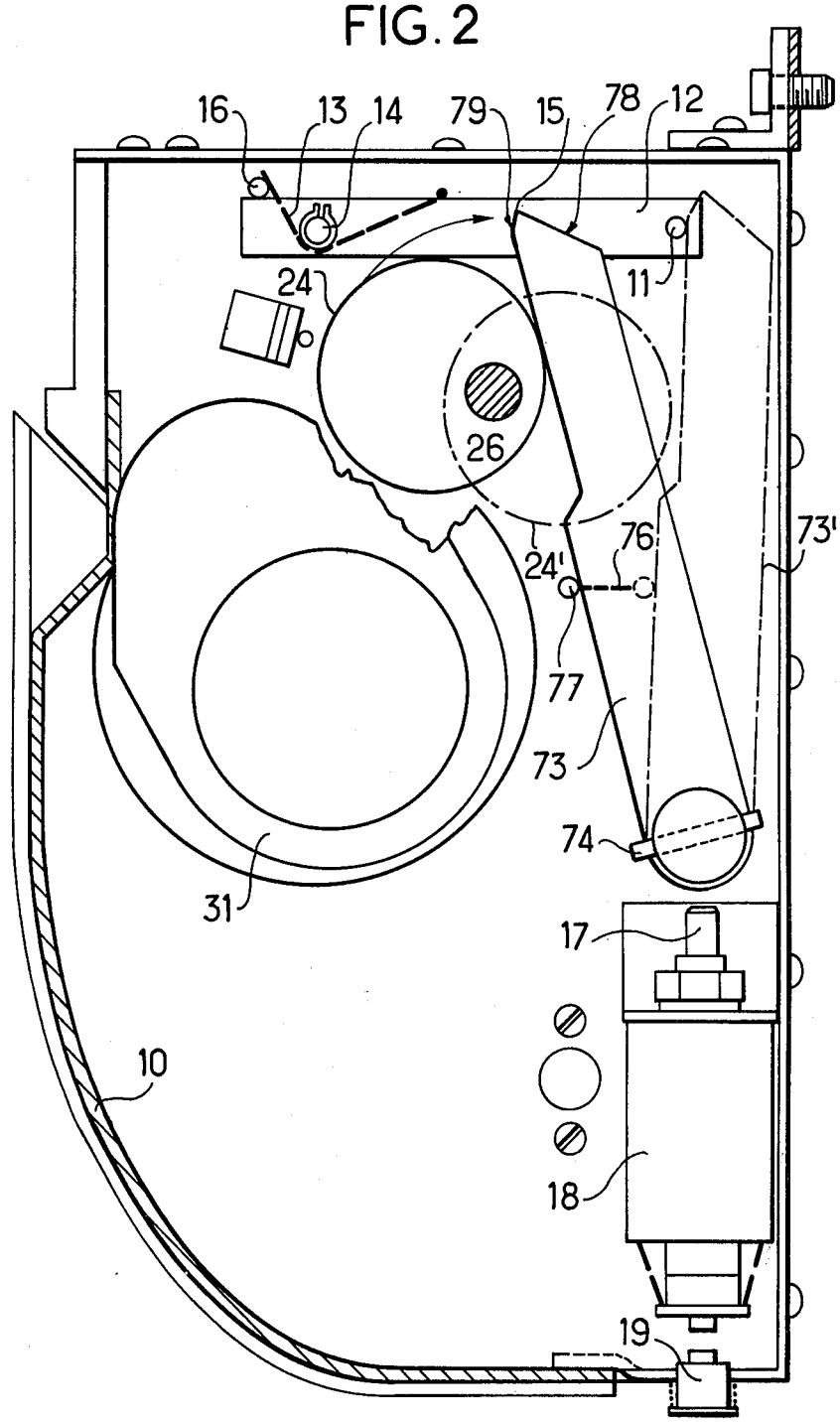
FIG. 2 is a diagrammatic view in profile of a facsimile receiver with the control device removed.

The facsimile receiver has a mechanical module 1 normally contained in a case 10, the latter being shown only in FIG. 2. The module comprises a drum 2, a drive roller 3, a supply roller 4, and a frame 5.

The drum 2 is arranged between the drive roller 3 and the roller 4, and is provided with a drive arrangement constituted by a motor 20 carrying a worm gear 21 engaging a tangential gear wheel 22 keyed on a shaft 26 of the drum 2. The cam 24 is arranged on one end of the shaft 26, and a conducting helix 25 is arranged on the surface of the drum 2.

The drive roller 3 is provided with a reduction motor 31 and a hand wheel 32.

The supply roller rests via its core 40 on two open supports carried by the frame 5 and forming bearings 41 and 42, arranged along the same axis of symmetry 46 as the core 40. One of the bearings is provided with a brake which is not shown. The axes of the drum 2 of the supply roller 4 and of the drive roller are parallel and are mounted on the frame 5 of the module.

The frame 5 comprises two sidewalls 50 and 50' between which are mounted parallel to the drum axis, a presser-roller 6, a guide roller 7, and a support 8 on which is fixed a printing bar 9. The frame assembly is articulated on the bearings 41 and 42 around the axis of the roller 4. On the framework of the module are mounted two V-shaped pieces 11 for receiving the shaft 7' of the guide roller 7.

The support 8 comprises a yoke 80 having sides 81 articulated about the axis 7' of the guide roller 7. Only the side 81 is visible in FIG. 1. The base of the yoke 80 comprises a slideway 82 which carries a sliding part 90 on which is fixed the printing bar 9. The sliding part 90 is also provided with a slider 91, which rides in a groove 70 in the guide roller 7 so as to reciprocate the yoke 80 in the manner described in the abovementioned co-pending application. The side 81 is connected by a regulating spring 84 to a cheek 83 disposed between the side 81 and the side 50 of the frame 5. The cheek 83 is itself articulated about the axis 7' of the guide roller 7 and connected to the sidewall 50 by a disengagement spring 51. The regulating spring 84 tends to bias the yoke 80 towards the drum 2 by about 7° to 8°. The spring 51, on the other hand, biases the cheek 83 away from the drum by about 15°.

A web of paper 44 from the supply roller 4 passes against the guide roller 7, then between the printing bar 9 and the helix 25, and finally between the drive rollers 3 and the presser-roller 6. The articulation movement of the support 8 and of the bar 9 is controlled by a return lever 71 disposed in front of the rear part 84 of the cheek 83. This return lever is articulated around the axis of a control shaft 72 to which it is rigidly fixed. The control shaft 72 is itself connected to a control lever 73, mounted on an axle 74 disposed transverse to the axis of the control shaft 72, as seen in FIG. 2. The lever 73 is subjected to the force of a bias spring 75, which tends to maintain the lever 73 in a position perpendicular to the axis of shaft 72. The lever 73 is also biased by a return spring 76 arranged between the control lever 73 and a fixed abutment 77 providing a rest stop for this lever, so as to hold the lever in a standby position.

The control lever 73 may occupy a first or locking position in which it may be locked adjacent and in the plane of the cam 24 under the action of the spring 76, as seen at 73' in FIG. 2. The control lever 73 may also occupy a second position situated outside the plane of the cam in which it can be displaced laterally towards the left, as seen in FIG. 2, by pivoting in the direction of the arrow F shown in FIG. 1 about the axle 74. This second position is the unlocked position.

It can be seen in FIG. 2 that when the drum 2 is driven in rotation, the cam 24 passes from its initial position shown in full lines to an end position 24' shown in dashed outline, which causes the rotation of the control lever 73 in a clockwise direction from its rest position in full lines to its working position 73', shown in dashed lines. This also causes rotation of the control shaft 72, as will be described hereinafter.

The end of the control lever 73 is provided with a nib 15 having inclined surfaces 78 and 79. During the course of the rotation of the control lever 73 with rotation of the cam 24, the inclined surface 78 contacts a locking finger 11 arranged in the plane of the cam 24 at the end of a locking lever 12 and causes the locking finger 11 to ride up over the end of the control lever 73. The lever 12 is articulated about the axis 14 and is provided with an opposing spring 13, which tends to rotate the locking lever 12 in the clockwise direction. As the cam 24 approaches the extreme position 24', the finger 11 is forced up by the inclined surface 78 until it passes the end of the nib 15. At this moment the opposing spring 13 causes the finger 11 to fly over the inclined surface 79 so that the control lever 73 is swung away from the cam 24'. The control lever 73 therefore escapes the action of the cam 24 and finds itself locked in the work position 73' by the lever 12, which abuts a stop 16 so as to be held in position by the force of spring 13.

In its rotation toward the work position 73', the control lever 73 drives the control shaft 72 and the return lever 71, which bears on the rear part 85 of the cheek 83 and causes the support 8 of the printing bar to pivot about the axis of the guide roller 7. The printing bar 7 pushes the paper web 44 into contact with the helix 25. The paper web 44 is then driven by the roller 33 and can therefore be printed on by the passage of current controlled by the facsimile signal from the transmitter. This current flows through the paper from the printing bar 9 to the helix 25, which effects a periodic scanning of the paper when the drum 2 is rotated by the motor 20. The contact pressure of the printing bar 9 against the web of paper 44 and the helix 25 of the drum 2 is automatically adjusted as a function of the wear of the bar 9, owing to the action of the regulating spring 84.

Figure 1:
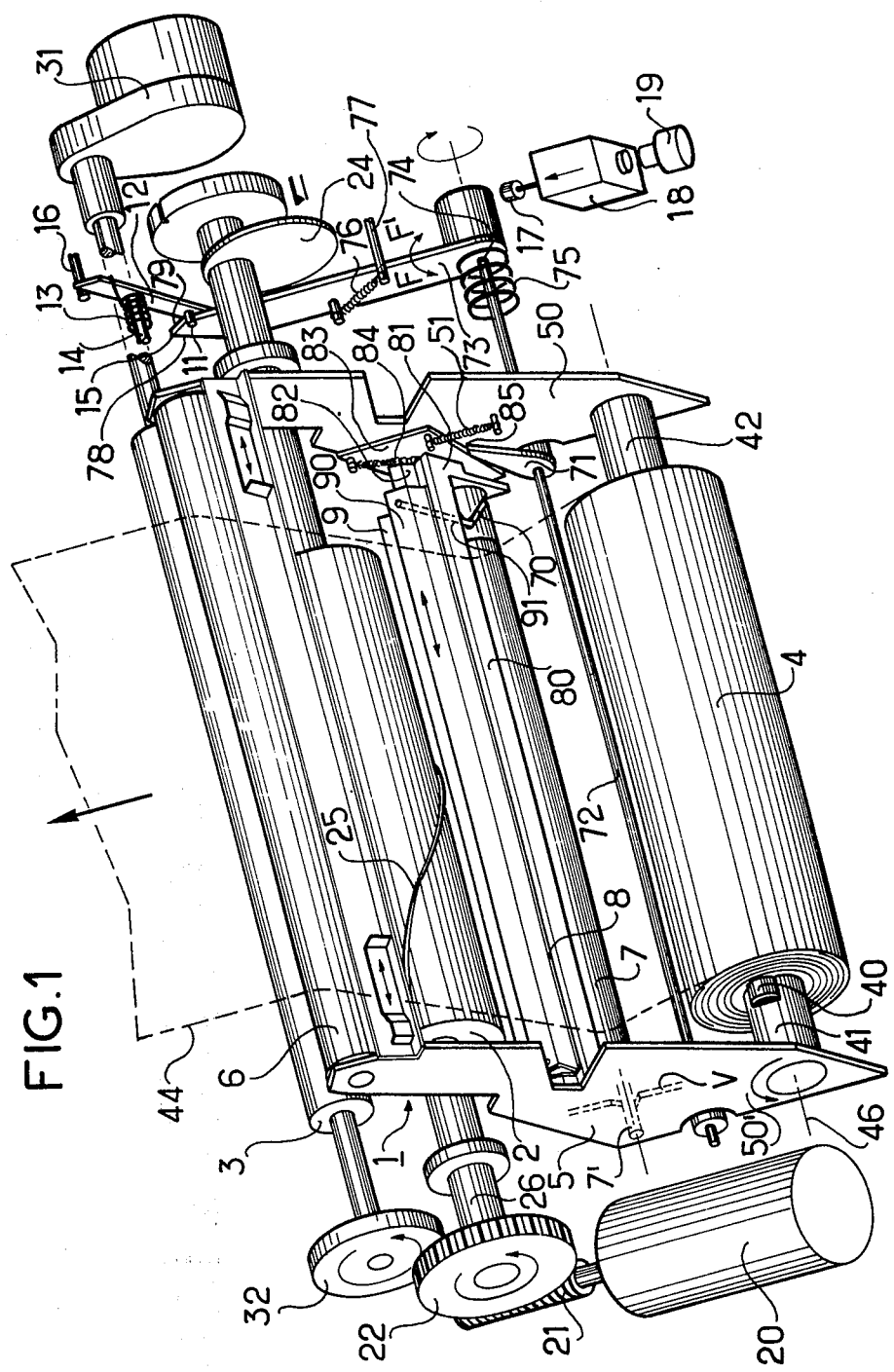
FIG. 1 is a perspective view of a portion of a facsimile receiver embodying the present invention.

The paper web 44 does not remain in contact with the printing bar and the helix when transmission is not in progress. In order to interrupt this contact at the end of a transmission, the control lever is moved from the locking position to the unlocking position and the end of the control lever disengages the finger 11. To this end, the electromagnet 18 is briefly energized which causes a rod 17 to act on the control lever 73, as seen in FIG. 1. The end of the control lever 73 pivots sideways towards the left around the axis 74 in the direction indicated by the arrow F, and this causes the inclined surface 79 to disengage from the locking finger 11. Under the effect of the return spring 76, the control lever 73, which is no longer in the plane of the cam 74, is returned to the abutment 77. The return lever 71 is then returned backwards under the action of the spring 51 by the cheek 83.

After the action of the electromagnet 18, the biasing spring 75 tends to return the control lever 73 in the direction of the arrow F' into the plane of the cam 24. Indeed, the return of the lever into the plane of the cam is possible only when the latter is disposed behind the lever 73. This condition can be realized according to the position occupied by the cam, either at the end of a transmission, or at the beginning of a transmission during the initial rotation of the cam.

Thanks to the control device in accordance with the present invention, the printing bar is automatically put in contact with the paper as soon as the drum starts to rotate, and it is maintained in contact by a mechanical locking device. The function of the device is not completely at the mercy of an electric failure.

Indeed, the operator of the apparatus can very easily overcome a failure of the electromagnet and manually unlock the control lever 73. It is merely necessary to give a brief tap on the control lever 73 in the direction of the arrow F, for example, with the aid of a pusher 19 acting on the rod 17 of the electromagnet 18.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. In a facsimile receiver including a printing bar and a rotatable drum carrying a printing helix adapted to cooperate with said printing bar to electrically print on a paper disposed therebetween, the improvement comprising printing bar support means for pivotably supporting said printing bar for movement from a rest position remote from said drum to an operative position where the printing bar bears on the helix, a control shaft mounted for axial rotation in parallel with said drum, a return lever mounted on said control shaft and bearing at one end against said printing bar support means so as to shift said printing bar support means to place said printing bar in its operative position upon rotation of said control shaft, bias means for normally biasing said printing bar support means to place said printing bar in its rest position, and control means responsive to rotation of said drum for rotating said control shaft, said control means including a cam mounted on the shaft of said drum for rotation therewith, a control lever mounted on said control shaft in the plane of said cam so as to be displaced by said cam from a standby position to a locking position upon rotation of said drum thereby rotating said control shaft to force said return lever against said printing bar support means to shift said printing bar to its operative position, locking means for locking said control lever in its locking position during the initial rotation of said cam, and means for normally biasing said control lever toward its standby position, said locking means including a locking lever carrying a locking finger disposed in the plane of said cam and being biased into a position in the path of movement of said control lever, the end of said control lever being provided with a nib so as to permit said locking finger to ride up over the end of said control lever only when said control lever moves from its standby position to its locking position in response to rotation of said cam, said locking finger preventing return movement of said control lever.

2. A facsimile receiver as defined in claim 1 wherein said control lever is mounted on said control shaft so as to be pivotable thereon about an axis transverse to the axis of said control shaft, said control means further including unlocking means responsive to a control signal for pivoting said control lever out of the plane of said locking finger so that said control lever may pass from its locking position to its standby position around said locking finger.

3. A facsimile receiver as defined in claim 2 wherein said unlocking means is an electromagnet positioned to act transversely on said control lever.

4. A facsimile receiver as defined in claim 2 further including spring means mounted on said control shaft in contact with said control lever to normally bias said control lever into the plane of said cam.

* * * * *